United States Patent [19]

Briguglio

[11] Patent Number: 5,373,297
[45] Date of Patent: Dec. 13, 1994

[54] MICROWAVE REPEATER WITH BROADBAND ACTIVE AND/OR PASSIVE ISOLATION CONTROL

[75] Inventor: Emanuel Briguglio, Bethesda, Md.

[73] Assignee: The United States of America as represented by the Secretary of the Navy, Washington, D.C.

[21] Appl. No.: 638,114

[22] Filed: Dec. 31, 1990

[51] Int. Cl.⁵ .............................................. G01S 7/38
[52] U.S. Cl. ..................................... 342/15; 342/159; 342/198
[58] Field of Search ........................... 342/198, 15, 159

[56] References Cited

U.S. PATENT DOCUMENTS

| | | | |
|---|---|---|---|
| 3,249,939 | 5/1966 | Meadows | 342/198 |
| 3,309,700 | 3/1967 | Garrison | 342/116 |
| 3,396,388 | 8/1968 | Goldie | 342/198 |
| 3,761,924 | 9/1973 | McGowan | 342/198 |
| 4,296,414 | 10/1981 | Beyer et al. | 342/37 |
| 4,325,141 | 4/1982 | Ghose | 455/63 |
| 4,736,455 | 4/1988 | Matsue et al. | 455/138 |
| 4,893,350 | 1/1990 | Minamisono et al. | 455/278 |

Primary Examiner—John B. Sotomayor
Attorney, Agent, or Firm—Thomas E. McDonnell; George Jameson

[57] ABSTRACT

A microwave repeater with antenna isolation comprises a first receiving antenna for receiving an input signal from a distant source; an amplifier section for amplifying and modulating the input signal to produce an output signal; a transmitting antenna coupled to the amplifier section; and an isolation control means including a second receiving antenna for isolating the first receiving antenna from the transmitting antenna. In one preferred embodiment, the second receiving antenna is aligned so as to match the gain and phase from the transmitting antenna to the first receiving antenna. The isolation control means comprises a phase shifter coupled to the second receiving antenna; and a power combiner having inputs coupled to the first receiving antenna and the phase shifter and an output coupled to the amplifier section. The power combiner receives the input signal from the first receiving antenna and a 180° phased shifted signal from the phase shifter.

7 Claims, 2 Drawing Sheets

MICROWAVE REPEATER WITH BROADBAND ACTIVE AND/OR PASSIVE ISOLATION CONTROL

FIELD OF THE INVENTION (U) The present invention relates generally to a microwave repeater, and, more specifically, to a microwave repeater having broadband isolation between transmitting and receiving antennas.

BACKGROUND OF THE INVENTION (U) Microwave repeaters in various forms have been used for many years. Repeaters are frequently used as electronic countermeasures to sophisticated radar systems.

In electronic warfare (EW) applications, EW repeaters receive an input signal from a distant enemy pulse or continuous wave radar system, modulate and amplify the received input signal, and then retransmit the modulated and amplified input signal, i.e., the output signal of the EW repeater. Modulation of the input signal includes phase, amplitude and frequency modulation. EW repeaters require both high gains and short time delays, e.g., a time corresponding to fraction of a pulse width, so that the processing logic of the enemy radar system is unable to distinguish between the retransmitted input signal of the EW repeater and the electromagnetic return signal from a target of interest.

Referring to FIG. 1, a conventional microwave repeater 1 comprises an antenna cluster 10, which includes a receiving antenna 12 coupled to a transmitting antenna 16 via both an amplifier section 14 and the ground plane. Amplifier section 14 includes a conventional traveling wave tube (TWT) or solid state amplifier 18 and a conventional modulator 20. The input signal from the distant enemy radar system received by antenna 12 is modulated in modulator 20, amplified in amplifier 18, and then retransmitted b antenna 16.

Microwave repeater 1 has a predetermined mutual coupling in the ground plane between antennas 12 and 16, i.e., the inverse of the isolation between the antennas. The gain of amplifier section 14 is maintained below the absolute value of the antenna isolation in order to prevent repeater 1 instability due to feedback from antenna 16 into antenna 12.

It is desirable for the gain of repeater 1 to be as large as possible so that the retransmitted input signal is interpreted as a large target by the enemy radar system. The limiting factor on the gain of repeater 1 is the isolation between antennas 12 and 16, not the gain achievable by amplifier section 14. Referring to FIGS. 1 and 2, conventional methods for improving the isolation between antennas 12 and 16 are illustrated. In FIG. 1, the primary isolation method is spatial separation between antennas 12 and 16, which provides spatial attenuation. In FIG. 2, isolation is achieved both by spatial separation and by a conventional ferrite absorber 22, which is located in the ground plane between antennas 12 and 16.

The basic problem with the conventional isolation methods shown in FIGS. 1 and 2 is providing a uniform impedance match between antenna 16 and absorber 22 over a broad frequency range. The conventional methods which have heretofore been used provide an ideal impedance match in only one frequency band, while providing large impedance mismatches in other frequency bands of the overall frequency range.

(U) Conventional interference cancellation methods using a main antenna and one or more auxiliary antennas, such as that disclosed in U. S. Pat. No. 4,893,350, require weighting circuitry for adjusting the amplitude of the undesired signal received at the auxiliary antenna as well as canceller circuitry for subtracting the adjusted undesired signal from the signal received at the main antenna. Since the signal received at the main antenna contains both the desired and the undesired signals, and since the undesired signals from both antennas are set equal to one another by the weighting circuitry, the canceller circuitry effectively removes the undesired signal. However, the circuitry required for weighting and cancelling, especially the circuitry for complex weighting of microwave signals, increases the time delay for coupling the desired signal from the main antenna to downstream amplifiers and processors.

SUMMARY OF THE INVENTION

Accordingly, the primary object of the present invention is to provide a microwave repeater with improved isolation between the providing antenna and the transmitting antenna, thereby accomodating increased electronics gain.

Another object of the present invention is to provide a microwave repeater which compensates for nonlinearities in system gain.

Still another object of the present invention is to provide a microwave repeater having a high gain which is comparable in cost to lower gain repeaters.

These and other objects and advantages are achieved in accordance with the present invention by a microwave repeater comprising a transmitting antenna for transmitting an output signal; an amplifier coupled to the transmitting antenna for generating the output signal based on an input signal; a first receiving antenna for receiving an input signal from a distant source; and isolation control means including a second receiving antenna for controlling the isolation between the first receiving antenna and the transmitting antenna.

According to one aspect of the present invention, the second receiving antenna is located proximate to the first receiving antenna and is focused to receive the near field output signal from the transmitting antenna; and the isolation control means further comprises a 180° phase shifter coupled to the output of the second receiving antenna, and a power combiner having inputs coupled to the first receiving antenna and the output of the phase shifter. The signal produced at the output of the power combiner is coupled to the input of the amplifier. Output signals from the transmitting antenna which are received by the first receiving antenna are cancelled in the power combiner by out-of-phase output signals produced by the phase shifter from output signals received by the second receiving antenna.

According to another aspect of the present invention, the second receiving antenna is located between the transmitting antenna and the first receiving antenna, and the isolation control means further comprises a matched dissipative load coupled to the second receiving antenna. The second receiving antenna is disposed so as to intercept the interfering output signal in the ground plane produced by the transmitting antenna and dissipates the received output signal in the load, thereby preventing coupling between the transmitting antenna and the first receiving antenna.

BRIEF DESCRIPTION OF THE DRAWINGS (U) The preferred embodiments are described with reference to the drawings, in which like elements are denoted by like numbers, and in which.

DESCRIPTION OF THE PREFERRED EMBODIMENTS

Figure 1:
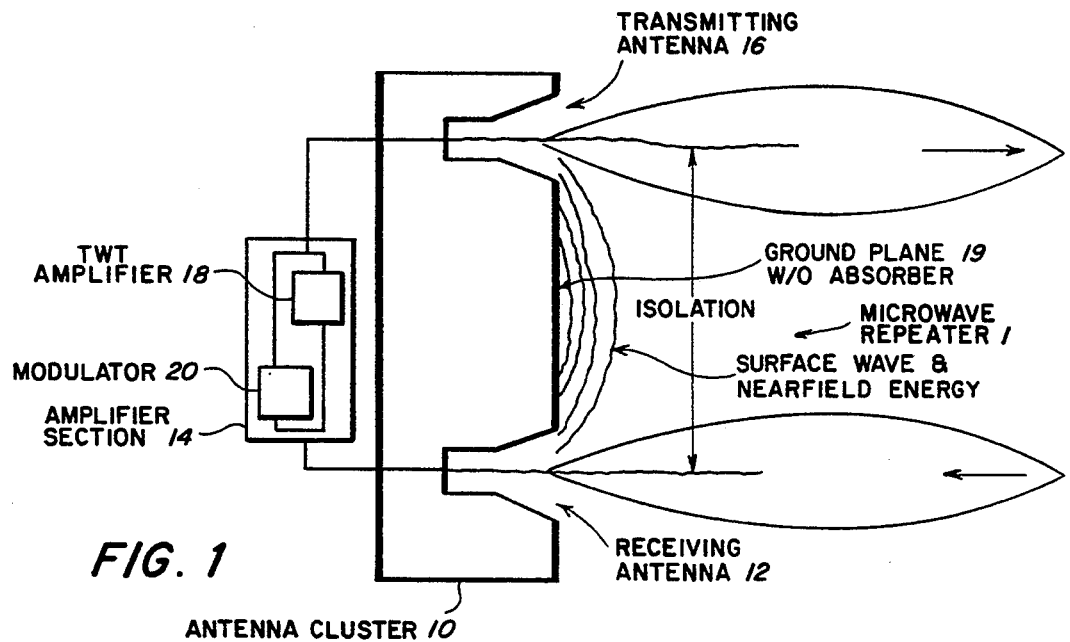
FIGS. 1 and 2 are schematic diagrams of conventional microwave repeaters.
Figure 2:
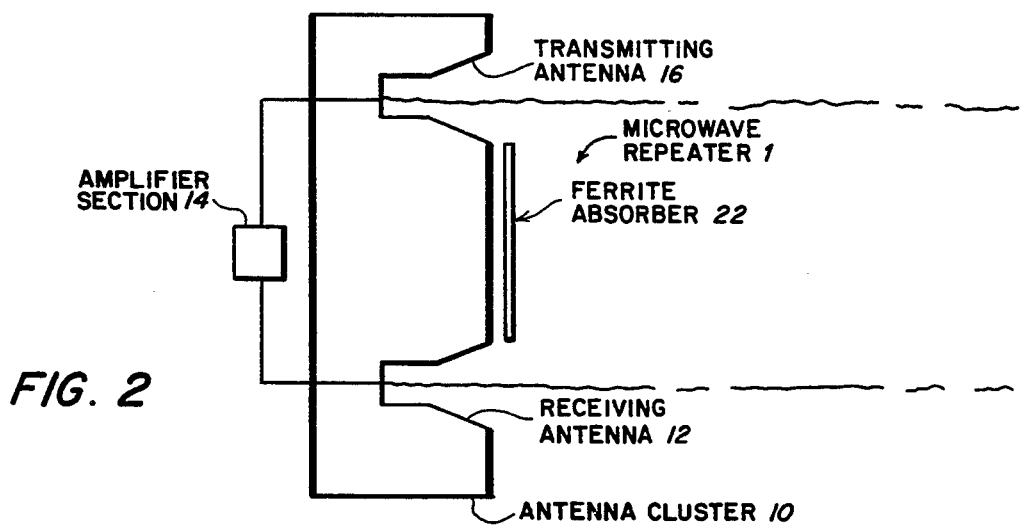
Figure 3:
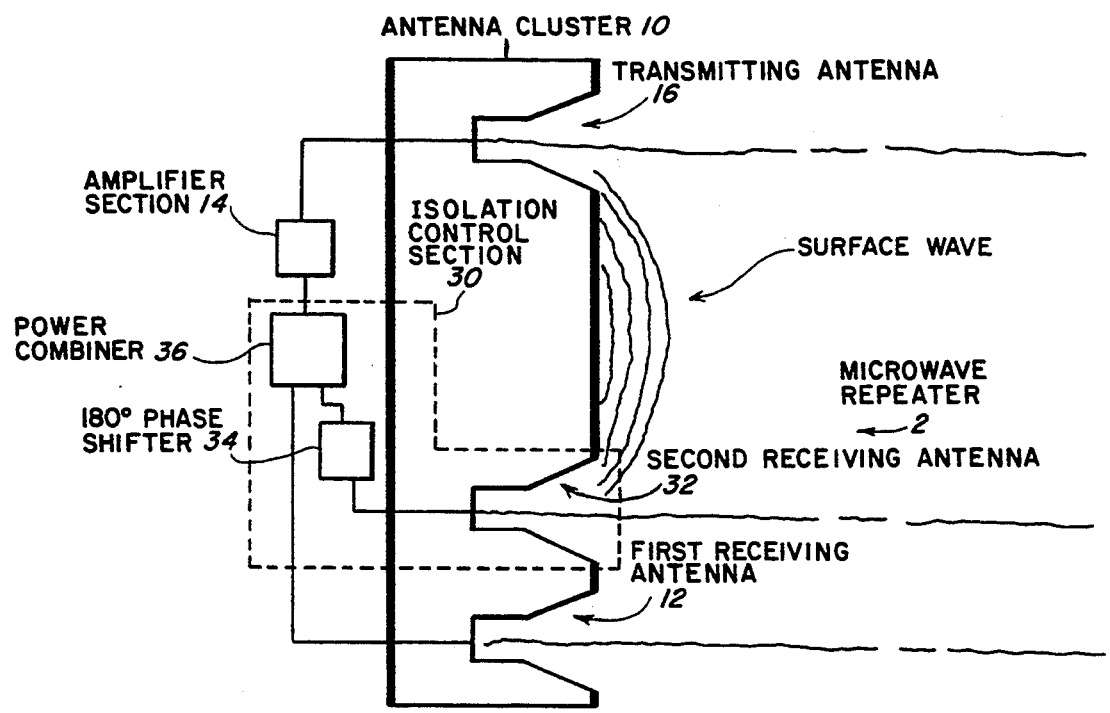
FIG. 3 is a schematic diagram of a first preferred embodiment of a microwave repeater according to the present invention.

Referring to FIG. 3, a first preferred embodiment of a microwave repeater 2 according to the present invention comprises a first receiving antenna 12 for receiving signals from a distant source, i.e., an enemy radar; a transmitting antenna 16; an amplifier section 14 and an isolation control section 30. It will be appreciated that antenna 12 also receives a portion of the output signal produced by antenna 16 as a first undesired signal. Section 30 includes a second receiving antenna 32 focused to receive a portion of the output signal from antenna 16 as a second undesired signal; a conventional power combiner 36 for producing a single output signal from two input signals; and a conventional 180° phase shifter 34. A first input of power combiner 36 is coupled to the output of antenna 12. Phase shifter 34 is coupled between the output of antenna 32 and a second input of combiner 36. Phase shifter 34 shifts the phase of the second undesired signal received by antenna 32 by 180° in order to produce a phase-shifted second undesired signal. The first undesired signal received from antenna 16 by antenna 12 and the phase-shifted second undesired signal output from phase shifter 34 cancel each other in combiner 36, leaving a residual signal, which is the input signal from the distant source isolated from the output signal from transmitting antenna 16. The output of combiner 36 is coupled to an input of amplifier section 14.

Antenna 32 is configured so that the main lobe of the antenna is directed toward transmitting antenna 16 so as to maximize the output signal from antenna 16 received by antenna 32. Antenna 12, which is aligned with a distant source, receives the output signal from antenna 16 in the sidelobes. It will be appreciated that the gain of the main lobe of antenna 32 is selected to be substantially equal to the sidelobe gain in antenna 12 due to the output signal from antenna 16. The output signal received by antenna 32 and phase shifted by phase shifter 34 is thus equal in magnitude but opposite in phase (sign) to the output signal received in the sidelobe of antenna 12. Combination of the signals from antenna 12 and phase shifter 34 in combiner 36 removes the contribution of the transmitting antenna 16 output signal from the input signal produced by antenna 12, thereby isolating antenna 16 from antenna 12.

Preferably, antennas 12 and 32 have identical broadband resistance, capacitance and inductance, thereby providing uniform antenna responses across the entire operating bandwidth of repeater 2. It will be appreciated that changes in the gain of amplifier section 14 will be equally received at antennas 12 and 32 and cancelled in combiner 36.

It will also be appreciated that antennas 12 and 32 of repeater 2 are not limited to any particular type of antenna. In an illustrative case, transmitting antenna 16 and receiving antennas 12 and 32 are omni-directional antennas, which would act as a tandem antenna pair for a far field source but would produce uniform sidelobe gains from near field sources. Thus, output signals from antenna 16 would produce equivalent signals in the sidelobes of both antennas 12 and 32, which would be cancelled by phase shifter 34 and combiner 36.

Figure 4:
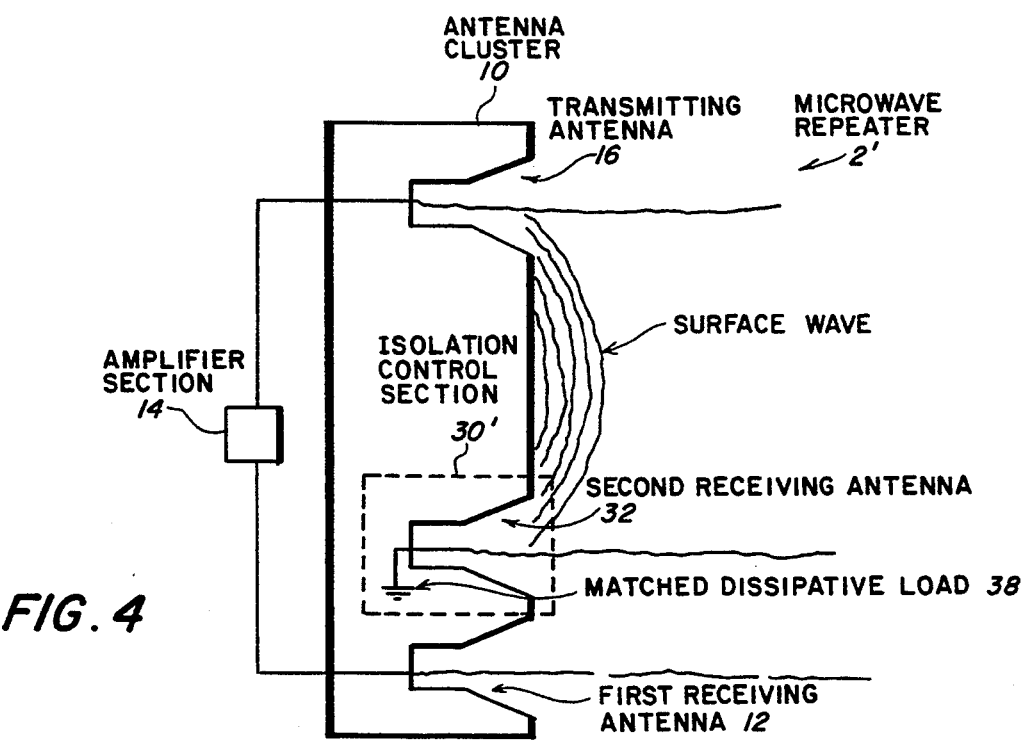
FIG. 4 is a schematic diagram of a second preferred embodiment of a microwave repeater according to the present invention.

Referring to FIG. 4, a second preferred embodiment of microwave repeater 2 according to the present invention, denoted 2', comprises first receiving antenna 12 and transmitting antenna 16, amplifier section 14, and an isolation control section, denoted 30', which is located proximate to antenna 12 and which is used for controlling the isolation between antennas 12 and 16. Control section 30' includes second receiving antenna 32, which is coupled to a matched dissipative load 38. Antennas 12, 16 and 32 have substantially equal resistance, inductance and capacitance so that the frequency response of the antennas across the entire frequency range is uniform. Preferably, antenna 16 is substantially identical to antenna 12, while antenna 32 is any conventional microwave antenna, i.e., surface wave, patch, trough, slot, horn or meanderline antenna. Antenna 32 is disposed between antennas 12 and 16 so as to intercept the surface wave output of antenna 16 before it reaches antenna 12. It will be appreciated that the configuration of antenna 32 is selected based on considerations such as polarization and phase tracking of the output signal from antenna 16. Load 38 receives the output signal from antenna 16, via antenna 32, which would otherwise be received by antenna 12, and which would produce interference in the received input signal. The output signal received by antenna 32 is coupled into load 38 and dissipated, thereby decreasing the sidelobe gain from the output signal in antenna 12 and increasing the isolation between antennas 12 and 16.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A microwave repeater with isolation control, said microwave repeater comprising:

a first receiving antenna for receiving an input signal from a distant source;

an amplifier coupled to said first receiving antenna for generating an output signal based on said input signal;

a transmitting antenna for transmitting said output signal; and isolation control means including a second receiving antenna located proximate to said first receiving antenna for isolating said first receiving antenna from said transmitting antenna.

wherein said first receiving antenna also receives a portion of said transmitted output signal as a first undesired signal, said second receiving antenna is focused to receive a portion of said transmitted output signal as a second undesired signal and said isolation control means comprises:

a phase shifter coupled to said second receiving antenna for shifting the phase of said second undesired signal received from said second receiving antenna by 180° in order to produce a phase shifted second undesired signal; and a power combiner responsive to said first undesired signal and said phase shifted second undesired signal for substantially cancelling said undesired signals so that substantially only said input signal from a distant source is applied to said amplifier.

2. The microwave repeater of claim 1, wherein the main lobe of said second receiving antenna is oriented so as to maximize reception of the output signal from said transmitting antenna.

3. The microwave repeater of claim 1, wherein said first and second receiving antennas and said transmitting antenna are omni-directional antennas.

4. The microwave repeater of claim 1, wherein said first and second receiving antennas have substantially equal broadband inductance, capacitance and resistance.

5. A microwave repeater having isolation control, comprising:

a first receiving antenna for receiving an input signal from a distant source;

amplification means coupled to said first receiving antenna for producing an output signal by amplifying and modulating said input signal;

a transmitting antenna coupled to said amplification means for broadcasting said output signal;

a second receiving antenna disposed between said first receiving antenna and said transmitting antenna for receiving said output signal from said transmitting antenna; and means for isolating said first receiving antenna from said transmitting antenna such that said input signal is isolated from said output signal, said isolating means including a dissipative load coupled to said second receiving antenna for substantially dissipating any undesired signals transmitted from said transmitting antenna toward said first receiving antenna.

6. The microwave repeater of claim 5, wherein said first and second receiving antennas have substantially equal broadband inductance, capacitance and resistance.

7. A microwave repeater having isolation control, said microwave repeater comprising:

a first receiving antenna for receiving an input signal from a distant source;

amplification means coupled to said first receiving antenna for producing an output signal by modulating and amplifying said input signal;

a transmitting antenna coupled to said amplification means for broadcasting said output signal;

a second receiving antenna for receiving said output signal from said transmitting antenna; and means for isolating said first receiving antenna from said transmitting antenna such that said input signal is isolated from said output signal;

wherein said first receiving antenna also receives a portion of said transmitted output signal as a first undesired signal, said second receiving antenna is focussed to receive a portion of said transmitted output signal as a second undesired signal; and said isolating means comprises:

phase shifter means coupled to said second receiving antenna for shifting the phase of said second undesired signal received from said receiving antenna by 180° in order to produce a phase shifted second undesired signal; and combiner means responsive to said first undesired signal and said phase shifted second undesired signal for substantially canceling said undesired signals so that substantially only said input signal from a distant source is applied to said amplification means.

* * * * *